United States Patent [19]

Guignard et al.

[11] 4,126,165

[45] Nov. 21, 1978

[54] WOOD LATHE CHISEL

[76] Inventors: Gelas S. Guignard; Joseph E. Bertin, both of Scotsfield Dr., Callander, Ontario, Canada, P0H 1H0

[21] Appl. No.: 842,067

[22] Filed: Oct. 14, 1977

[51] Int. Cl.[2] .......... B23B 27/00

[52] U.S. Cl. .......... 142/56; 142/49; 142/55

[58] Field of Search .......... 142/56, 55, 49, 35, 142/38, 7

[56] References Cited

U.S. PATENT DOCUMENTS

| | | | |
|---|---|---|---|
| 846,272 | 3/1907 | Whipple et al. | 142/56 |
| 2,101,379 | 12/1937 | Zackowitz | 142/56 |
| 2,764,187 | 9/1956 | Zemrowski | 142/56 |
| 2,848,020 | 8/1958 | Zemrowski | 142/56 |
| 2,914,098 | 11/1959 | McLennan, Sr. | 142/56 |
| 3,229,731 | 1/1966 | Hilton | 142/56 |

*Primary Examiner*—Leonidas Vlachos
*Attorney, Agent, or Firm*—Daniel Jay Tick

[57] ABSTRACT

A cutter for cutting wood is adjustably mounted in a handle and extends beyond the handle at a first end of the handle. A cutter positioning device in the handle is coupled to the cutter in the handle and has a manually operable part extending from a second opposite end of the handle for selectively positioning the cutter relative to the first end of the handle. A gage for maintaining a selected space between the cutter and a workpiece is adjustably mounted in the handle at the first end thereof. A diverting device in the handle diverts wood particles cut from a workpiece by the cutter to a side of the handle.

4 Claims, 5 Drawing Figures

WOOD LATHE CHISEL

BACKGROUND OF THE INVENTION

The present invention relates to a wood lathe chisel. Objects of the invention are to provide a wood lathe chisel of simple structure, which is inexpensive in manufacture, used with facility and convenience, especially usable by novices and beginners due to the control of the cutting depth thereof, and functions efficiently, effectively and reliably to divert wood particles cut from a workpiece to a side to prevent such particles from flying into the face and eyes of a user and thereby preventing injury of the user.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
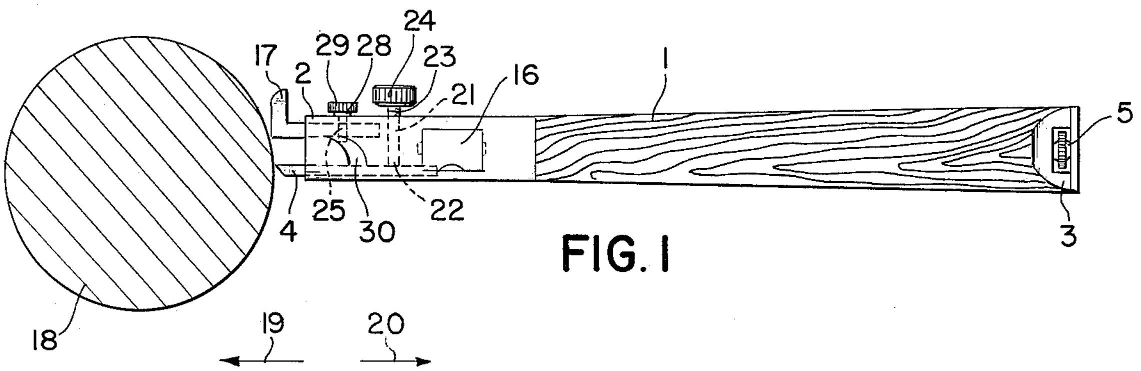
FIG. 1 is a side view of an embodiment of the wood lathe chisel of the invention.
Figure 4:
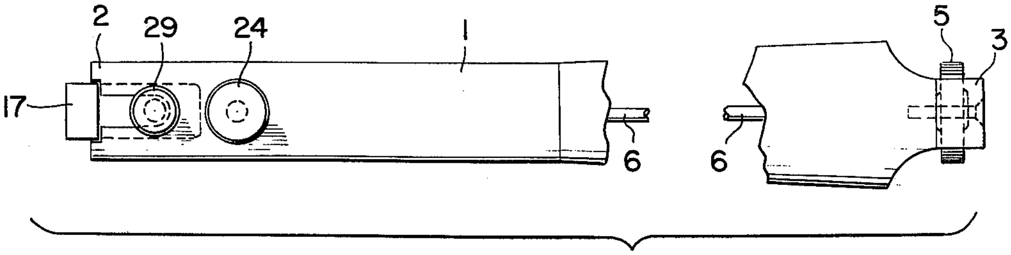
FIG. 4 is a top plan view of the embodiment of FIG. 1.

The wood lathe chisel of the invention comprises a handle member 1 (FIGS. 1 to 4) having spaced opposite first and second ends 2 and 3, respectively (FIGS. 1 and 4).

Figure 2:
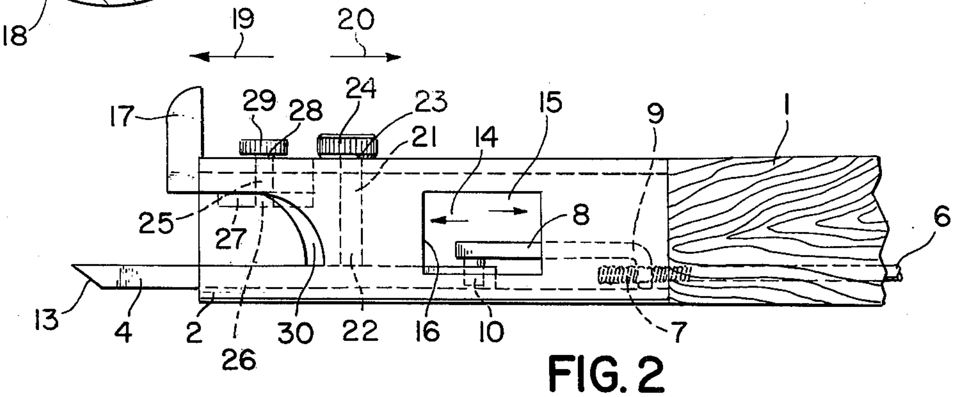
FIG. 2 is a view, on an enlarged scale, of part of the embodiment of FIG. 1.
Figure 3:
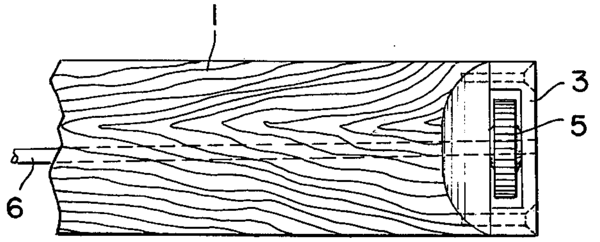
FIG. 3 is a view, on an enlarged scale, of the remaining part of the embodiment of FIG. 1.

A cutter member 4, of the type of a wood chisel, for cutting wood, is adjustably mounted in the handle member 1 and extends beyond the handle member at the first end 2 thereof, as shown in FIGS. 1 and 2.

Figure 5:
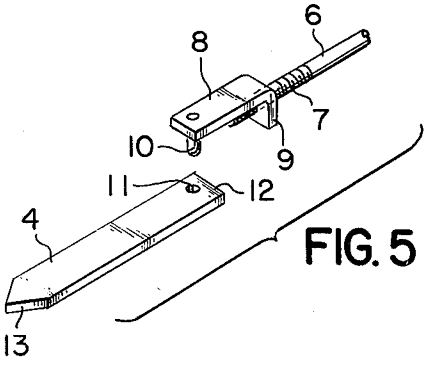
FIG. 5 is a perspective exploded view of the coupling between the cutter member and the cutter positioning device of the wood lathe chisel of the invention.

A cutter positioning device is provided in the handle member 1 and is coupled to the cutter member 4 in said handle member. The cutter positioning device has a manually operable knurled knob 5 (FIGS. 1, 3 and 4) extending from the second end 3 of the handle member 1 for selectively positioning the cutter member 4 relative to the first end 2 of the handle member. The cutter positioning device comprises a rod 6 (FIGS. 2 to 5). The knob 5 is affixed to one end of the rod 6 and rotates therewith. The opposite end of the rod 6 is externally threaded to provide a threaded area 7, as shown in FIGS. 2 and 5.

The rod 6 is releasably coupled to the cutter member 4 via a bracket member 8 (FIGS. 2 and 5). The bracket member 8 has an arm 9 extending at right angles therefrom at one end thereof and having an internally threaded bore formed therethrough in coupling relation with the threaded area 7 of the rod 6. A pin 10 (FIGS. 2 and 5) extends from the other, opposite, end of the bracket member 8 in substantially parallel relation with the arm 9. The pin 10 is accommodated in a bore 11 formed through the cutter member 4 at the end 12 of said cutter member opposite the cutting edge 13 thereof (FIGS. 2 and 5).

Thus, when the user rotates the knob 5, the rod 6 rotates in the same direction and causes the bracket member 8 to move in a selected one of the directions indicated by arrows 14 and 15 in FIG. 2. The cutter member 4 is moved in the same direction due to the coupling of the bracket member 8 therewith via its pin 10.

An access window 16 (FIGS. 1 and 2) is formed in the handle member 1 to provide access to the bracket member 8 of the cutter positioning device.

A gage member 17 (FIGS. 1, 2 and 4) maintains a selected space between the cutter member 4 and a workpiece 18 (FIG. 1). The gage member 17 is adjustable mounted in the handle member 1 at the first end 2 of said handle member and is movable in selected directions indicated by arrows 19 and 20 in FIG. 2. The gage member 17 is thus positioned prior to the use of the wood lathe chisel of the invention to prevent the cutting member 4 from cutting too deeply into the workpiece 18. This enables the chisel of the invention to be used by novices and beginners without destroying the workpiece 18.

A cutter securing device comprises an externally threaded stem 21 having one end 22 in very close proximity with the cutter member 4 (FIGS. 1 and 2). The opposite end 23 of the stem 21 extends out of the handle member 1 and has a knurled knob 24 affixed thereto and rotatable therewith (FIGS. 1, 2 and 4). The stem 21 is threadedly coupled in an internally threaded bore through the handle member 1 to the cutter member 4, so that the user may secure the cutter member in any desired position by rotating said stem, via the knob 24, until the end 22 of said stem is in close abutment with said cutter member.

A gage securing device comprises an externally threaded stem 25 having one end 26 (FIG. 2) threadedly coupled in a nut 27 (FIG. 2). The opposite end 28 of the stem 25 extends out of the handle member 1 and has a knurled knob 29 affixed thereto and rotatable therewith (FIGS. 1, 2 and 4). The stem 25 is threadedly coupled in an internally threaded bore through the handle member 1 to the nut 27, so that the user may secure the gage member 17 in any desired position by rotating said stem via the knob 29 until the end 26 of said stem is securely threadedly tightened in said nut thereby clamping said gage member in position.

A diverting device, comprising an angular groove 30, is formed in the handle member, as shown in FIGS. 1 and 2, for diverting wood particles cut from a workpiece by the cutter member 4 to a side of the handle member thereby preventing such particles from flying into the face and eyes of the user.

While the invention has been described by means of a specific example and in a specific embodiment, we do not wish to be limited thereto, for obvious modifications will occur to those skilled in the art without departing from the spirit and scope of the invention.

Chisels of the type described in the present application are disclosed in U.S. Pat. Nos. 7,535; 868,168; 2,068,625; 2,884,025; 2,919,727; 3,277,933; 3,760,475; 3,813,970; 3,841,646; 3,848,486; 3,918,333 and 3,945,752.

We claim:

1. A wood lathe chisel, comprising a handle member having spaced opposite first and second ends;

a cutter member for cutting wood adjustably mounted in the handle member and extending beyond said handle member at the first end of the handle member;

cutter positioning means in the handle member and coupled to the cutter member in the handle member and having a manually operable part extending from the second end of the handle member for selectively positioning the cutter member relative to the first end of said handle member;

a gage member for maintaining a selected space between the cutter member and a workpiece, said gage member being adjustably mounted in the handle member at the first end thereof; and diverting means in the handle member for diverting wood particles cut from a workpiece by the cutter member to a side of said handle member.

2. A wood lathe chisel as claimed in claim 1, wherein the cutter positioning means is releasably coupled to the cutter member and further comprising access means formed in the handle member to provide access to the cutter positioning means.

3. A wood lathe chisel as claimed in claim 1, wherein the diverting means comprises an angular groove formed in the handle member.

4. A wood lathe chisel as claimed in claim 1, further comprising cutter securing means for releasably securing the cutter member in position and gage securing means for releasably securing the gage member in position.

* * * * *